US008856672B2

(12) United States Patent
Dunn et al.

(10) Patent No.: US 8,856,672 B2
(45) Date of Patent: Oct. 7, 2014

(54) INTEGRATED USER INTERFACE CONTROLS FOR WEB DIALOGS

(75) Inventors: Jeffrey C. Dunn, Seattle, WA (US); John S. Pruitt, Bothell, WA (US); Shawn Lipstein, Seattle, WA (US); Cindy Liao, Bellevue, WA (US); Jonathan Fred Kern, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 721 days.

(21) Appl. No.: 12/777,407

(22) Filed: May 11, 2010

(65) Prior Publication Data
US 2011/0283215 A1 Nov. 17, 2011

(51) Int. Cl.
*G06F 3/048* (2013.01)
*G06F 9/44* (2006.01)

(52) U.S. Cl.
CPC .................................... *G06F 9/4443* (2013.01)
USPC ......................................................... 715/771

(58) Field of Classification Search
CPC ............................... G06F 9/4443; G06F 3/048
USPC ......................................................... 715/771
See application file for complete search history.

(56) References Cited

U.S. PATENT DOCUMENTS

| | | | | |
|---|---|---|---|---|
| 5,579,466 | A * | 11/1996 | Habib et al. | 715/210 |
| 6,971,068 | B2 | 11/2005 | Bates et al. | |
| 2002/0073125 | A1* | 6/2002 | Bier | 707/530 |
| 2004/0128349 | A1* | 7/2004 | Maruyama | 709/203 |
| 2005/0091577 | A1* | 4/2005 | Torres et al. | 715/507 |
| 2006/0036965 | A1* | 2/2006 | Harris et al. | 715/777 |
| 2006/0253799 | A1 | 11/2006 | Montroy et al. | |
| 2007/0050710 | A1 | 3/2007 | Redekop | |
| 2007/0208607 | A1* | 9/2007 | Amerasinghe et al. | 705/10 |
| 2009/0006948 | A1* | 1/2009 | Parker et al. | 715/255 |
| 2010/0011032 | A1* | 1/2010 | Fukuoka | 707/203 |
| 2011/0125724 | A1* | 5/2011 | Mo | 707/706 |

OTHER PUBLICATIONS

"Jonathon's SharePoint Notes", Retreived at <<http://blogs.msdn.com/jfrost/archive/2009/11/08/how-to-display-a-sharepoint-dialog-from-ribbon-button-and-get-selected-item-context.aspx >>, 2010, pp. 7.
Mosher, Barb., "SharePoint 2010, A Business Collaboration Platform", Retreived at << http://www.cmswire.com/cms/enterprise-20/sharepoint-2010-a-business-collaboration-platform-005042.php >>, Jul. 15, 2009, pp. 7.
Pabari, Raj., "Ribbon-style Two-level Tab Bar for Dialog Boxes in WTL", Retreived at << http://www.codeproject.com/KB/wtl/wtl-ribbon-tab-bar.aspx >>, pp. 5.
"Cross Browser DHTML Modal Dialogs for Web Apps", Retreived at << http://sublog.subimage.com/2006101/011subModal >>, 2006, pp. 3.
"Modal and Modeless Dialog Boxes", Retreived at << http://www.webreference.com/js/column90/4.html >>, Mar. 11, 2010, pp. 3.

* cited by examiner

*Primary Examiner* — Boris Pesin
*Assistant Examiner* — Angie Badawi
(74) *Attorney, Agent, or Firm* — Tom Wong; Jim Ross; Micky Minhas (57) ABSTRACT

A web application dialog user interface is provided for presenting users with controls for viewing, editing, and otherwise managing content through the web application. Consistency in style and order of control elements in the user interface with control elements of a standard application user interface, launching of the dialog without a page refresh, and maintenance of task continuity provide users a seamless experience in managing their documents through the web application without loss of context.

20 Claims, 9 Drawing Sheets

INTEGRATED USER INTERFACE CONTROLS FOR WEB DIALOGS

BACKGROUND

Some computer applications such as word processing, spreadsheet, presentation, communication, and image processing applications provide contextual user interface controls in the form of textual and/or graphical elements, typically positioned at a predetermined location of the user interface. A number, a type, and an order of such controls may be customized based on content, user preferences, available viewing space, etc. In many applications, when a new document is opened, a new viewing pane along with its user interface controls may be opened (or the current document hidden), which typically means loss of contextual continuity for the user.

With the increasing popularity of web applications located on servers within an enterprise or online (hosted offering) and accessed by clients for a wide variety of operations, typical tasks of computer applications are being taken over by document sharing, search, analysis, reporting, data mining, and similar web services. Web applications enable users to perform the same tasks as with local applications through user interfaces provided within a browsing application user interface. Pop-ups, dialog boxes, and task panes are user interfaces that may be used by a web application, but not necessarily in a consistent manner. The appearances of these user interfaces may differ, breaking contextual integrity and degrading user experience in some cases. Furthermore, determining which control elements to display in a limited viewing space and preserving task flow for users are additional challenges with web applications.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a user interface for presenting users with controls for viewing, editing, and otherwise managing content through a web application dialog. Consistency in style and order of control elements in the user interface with control elements of a standard application user interface, launching of dialog without a page refresh, and maintenance of task continuity provide users a seamless experience in managing their documents through a web application without loss of context.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a seamless user experience in managing documents through a web application without loss of context may be provided by employing a user interface presenting controls for viewing, editing, and otherwise managing content through a web application dialog. The dialog may be launched without a page refresh and task continuity may be maintained through consistency in style and order of control elements in the user interface with control elements of a standard application user interface. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing computer and network operations, which may provide web applications with hosted web pages and dialog interactions. Examples of platforms include, but are not limited to, a hosted service executed over a plurality of servers, an application executed on a single server, and comparable systems. The term "server" refers to a computing device executing one or more software programs typically in a networked environment. More detail on these technologies and example operations is provided below.

Figure 1:
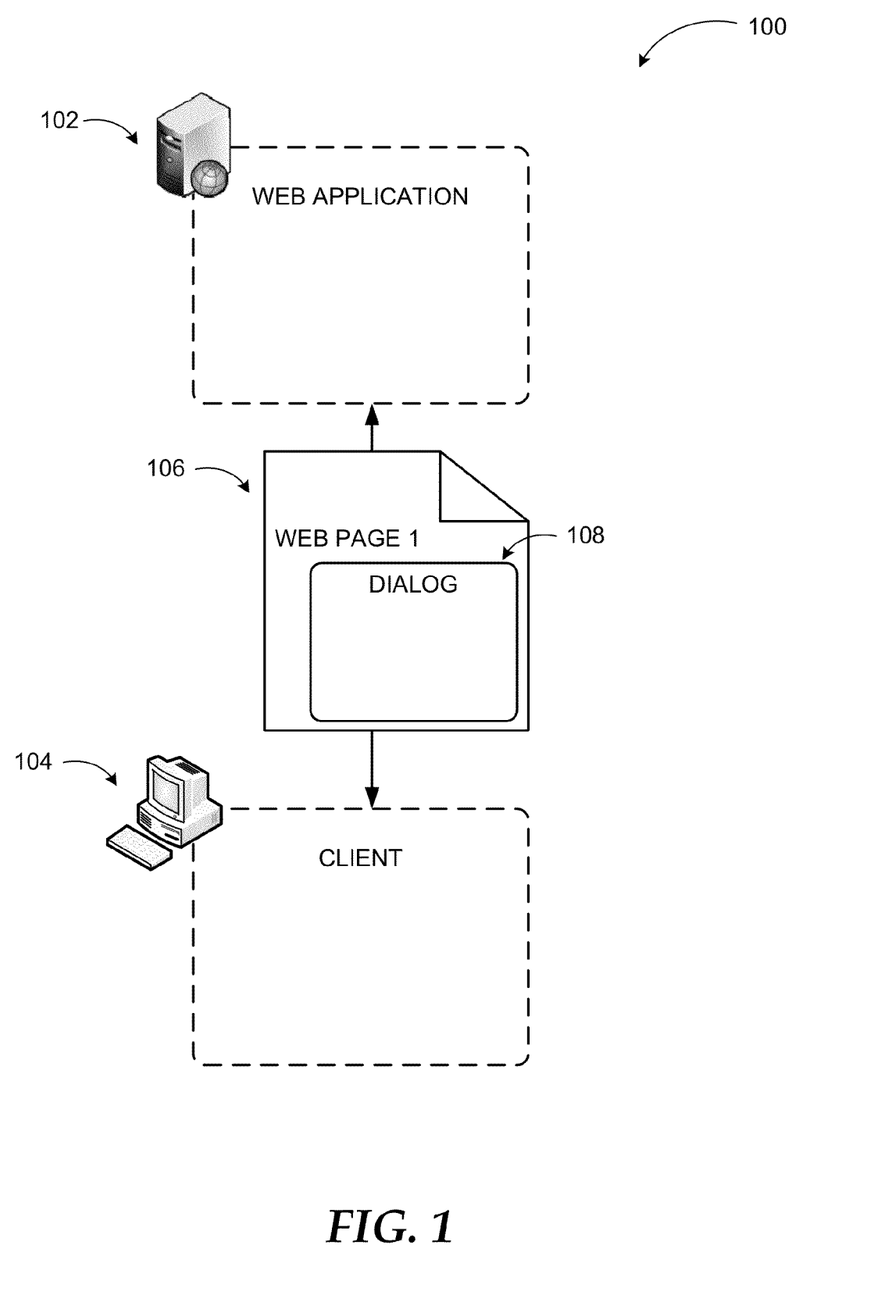
FIG. 1 is a conceptual diagram illustrating relationships between web pages and dialogs in a web application implementation.

FIG. 1 includes conceptual diagram 100 illustrating relationships between web pages and dialogs in a web application implementation. The networked web application environment shown in diagram 100 is for illustration purposes. Embodiments may be implemented in various networked environments such as enterprise-based networks, cloud-based networks, and combinations of those.

In a conventional system, a user has locally installed applications on their computing device for editing or viewing documents, performing computations or analyses, storing data, and other tasks. Such applications not only consume resources, but they also present the challenge of each user's machine having to be set up initially, maintained with hardware and software upgrades, debugged individually in case of problems, etc. Addressing many of the challenges of the locally installed application model, web applications provide access to the same services through a distributed computing model, where the application performing the tasks is executed on one or more servers and accessed through client devices by the users.

Increasingly popular, web applications are replacing the individual computing model in a networked environment. In a typical operation, a user may access web application 102 through a browsing application executed on their client device 104. The services are usually provided through one or more web pages. For example, the user may access a document sharing service. The service may present a list of available documents through a graphical user interface in a first web page. Upon selection of a document from the list, the selected document may be made available through a second web page. The user may be enabled to edit, view, or perform other tasks on the selected document through user interface elements provided on dialog 108 displayed within web page 1 (106). If the user performs multiple tasks successively such as editing the document, viewing it, then editing more, and viewing again, a new dialog may be opened each time.

In a system according to embodiments, user interface controls consistent with a style and order of controls of the web application are provided in dialog 108 and any subsequent dialogs. As discussed in more detail below, a dialog may be opened to enable users to view documents, another to edit documents, and so on. Of course, other tasks such as data mining, search, analysis, etc. may also be performed through a dialog as described herein. Additional dialogs may be opened directly from web page 1 (106) or from within dialog 108. The user may experience a consistent context as they navigate through the web application in a system according to embodiments.

The example system in FIG. 1 has been described with specific servers, client devices, web applications, and interactions. Embodiments are not limited to systems according to these example configurations. A platform providing integrated user interface controls for web dialogs may be implemented in configurations employing fewer or additional components and performing other tasks. Furthermore, specific protocols and/or interfaces may be implemented in a similar manner using the principles described herein.

Figure 2:
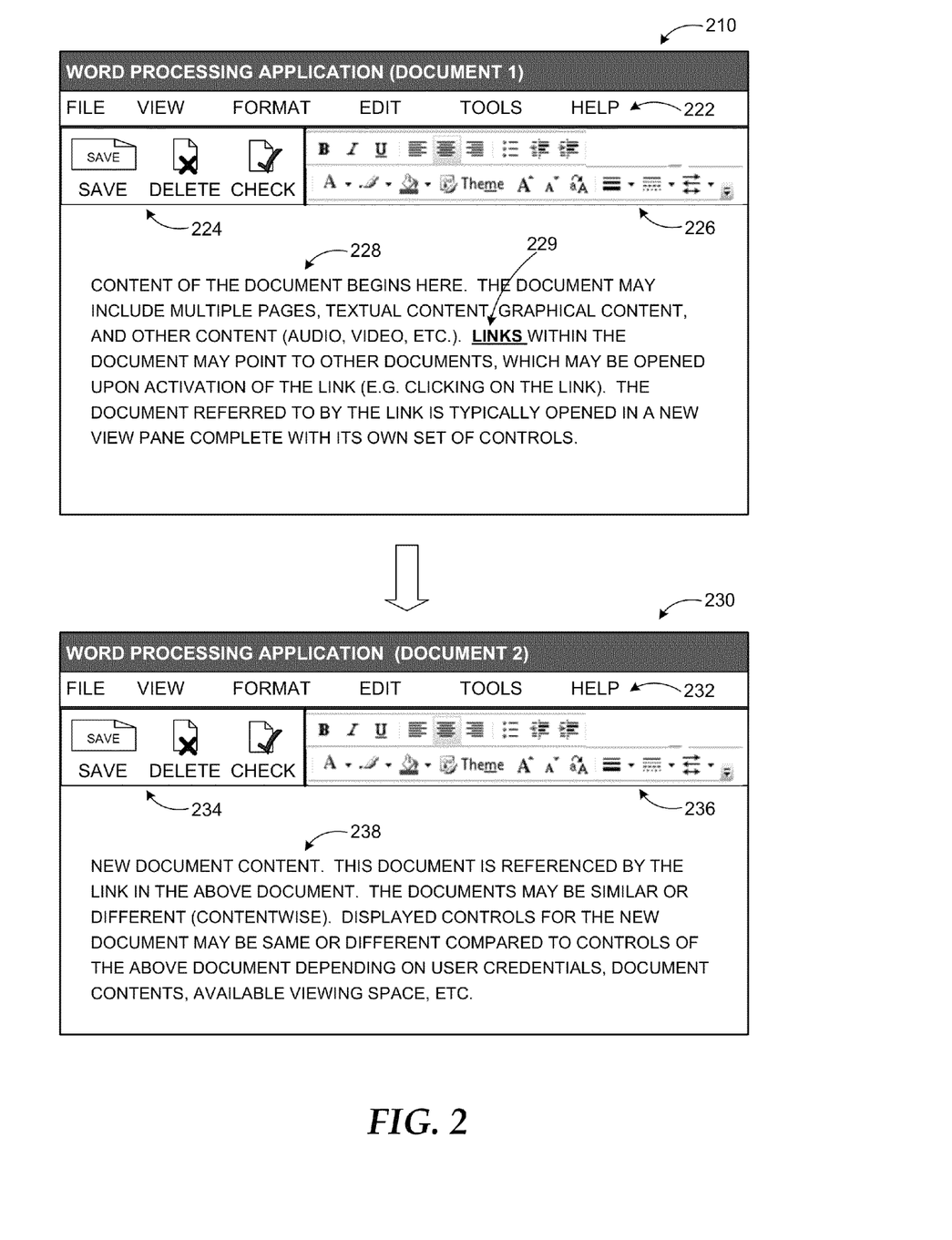
FIG. 2 illustrates an example word processing application user interface displaying two separate documents, where the transition from one document to the other may result in loss of context.

FIG. 2 illustrates an example word processing application user interface displaying two separate documents, where the transition from one document to the other may result in loss of context. As screenshot 210 illustrates, content of a document is displayed along with a number of user interface elements. The elements may include a host of menu items 222, which may present, upon selection, drop-down or similar menus of commands. Additionally, groups of textual/graphical control elements (e.g. 224, 226) may also be displayed to enable the user perform tasks associated with managing, editing, viewing the document content 228. Control elements may be displayed as purely textual elements, purely graphical elements (icons), or a combination of those two. Control elements may also be grouped according to functionality categories. Content 228 may include text, graphics, or other types of content such as embedded audio or video. Content 228 may further include links 229, which, when activated, may result in display of another document.

Each time a new document is opened (through a link or other means), a new viewing pane as shown in screenshot 230 may be presented. Alternatively, different open documents may be displayed in a tabbed manner, where only one document is presented at any time, but the user can switch between displayed documents through clicking on tabs, for example. That means, user interface controls such as textual menus 232, and controls 234, 236 are displayed with each new document 238. The user interface controls may be persistent, i.e. the same number and type of controls may be displayed for each document. Alternatively, the user interface controls may be customizable, i.e. the number and type of displayed controls may be modified based on document type, user preference, available viewing space, and so on.

Regardless of the presentation of user interface controls, conventional applications and web applications modeled after conventional applications typically lack contextual consistency when a user switches between documents. In addition, developers face the challenge of determining which (or how many) controls to display in a relatively small amount of viewing space when the application user interface is limited to a dialog within a web application page. Moreover, preserving task flow for end users and maintaining consistent presentation of commands across list-level and form-level interactions for users present challenges to web application designers as well.

Figure 3:
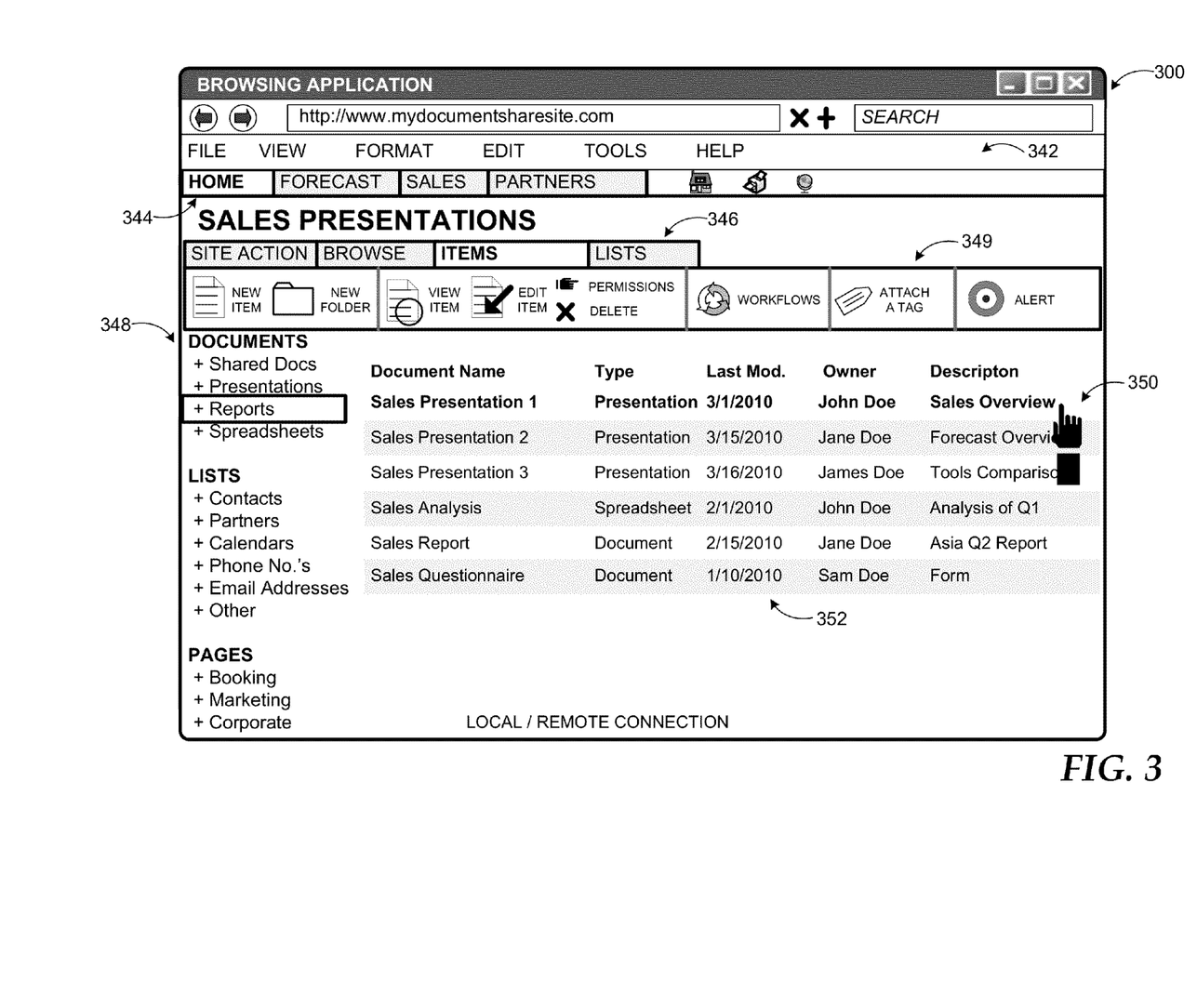
FIG. 3 illustrates an example document list view of a document sharing web application, where embodiments may be implemented.

FIG. 3 illustrates an example document list view of a document sharing web application, where embodiments may be implemented. As mentioned above, a user may access a web application such as a document sharing service through browsing application 300. Browsing application 300 has standard user interface elements such as a text box for entering the Uniform Resource Locator (URL) address of the web application, a search box, and command menus 342 (e.g. "file", "view", "edit", etc.). The menu items may provide the user a drop-down menu, a hover-on menu, or similar options for selecting various tasks associated with the browsing application 300.

The example web application may include a number of top level web pages 344 such as "Home", "Forecast", "Sales", and "Partners", which may be made available using tabs or similar presentation methods. In the example of FIG. 3, the user is at the "Sales Presentations" page provided by the web application. A tree-structure menu of available pages (348)

may be provided on one side of the displayed web page. The web page "Sales Presentations" presents a list of available documents (352) with summary information such as document type, modification date, owner, short description, etc. User interface elements such as graphical controls 349 enable the user select tasks associated with the listed documents. For example, the user may create a new document, a new folder, view an existing document, edit an existing document, attach a tag to a document, etc. The user may accomplish some of the same tasks by clicking on one of the documents in the list 352 as well. Operations associated with the documents listed on web page "Sales Presentations" may further be presented in a tabbed format (346), where relevant operations and views may be grouped under predefined categories like "Items" or "Lists".

A web application such as the one described herein enables users to interact with lists (e.g. task lists, document lists) by launching commands from its user interface and to act on individual or multiple documents or tasks again through commands in the user interface. Through web application presented dialogs, users may be enabled to view and edit data associated with individual items (documents or tasks) on the lists such as list 352. A web application according to embodiments may provide a consistent user interface with similar control elements at the list level as well as item level, automatically adjusting number and grouping of controls based on available viewing space, dialog state, item type, and similar factors.

Figure 4:
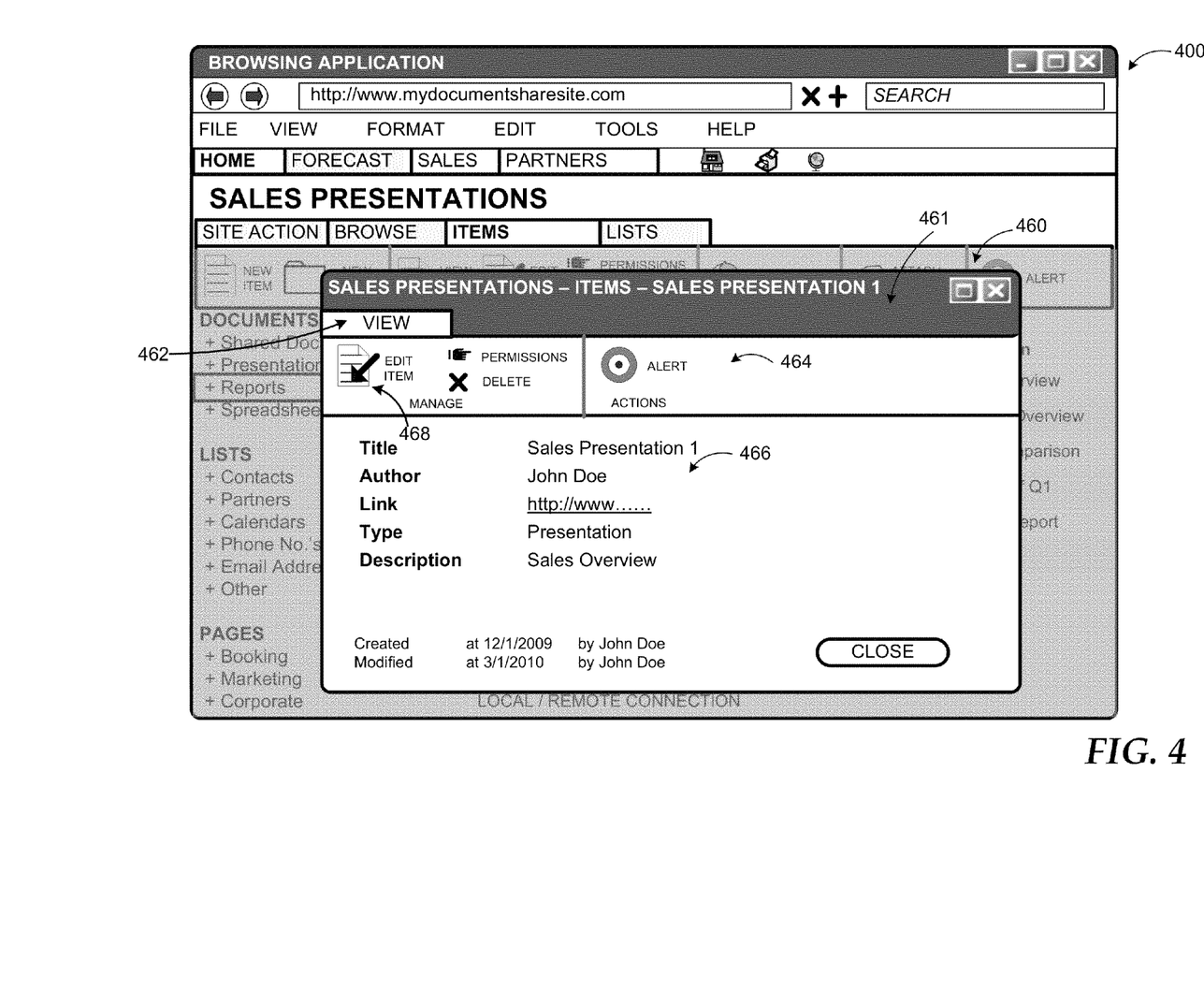
FIG. 4 illustrates an example dialog presenting a viewing form to a user.

FIG. 4 illustrates an example dialog presenting a viewing form to a user. Upon selection of a document ("Sales Presentation 1" 350) from the list 352 of FIG. 3, dialog 460 may be presented within browsing application 400 as shown in FIG. 4. Some of the displayed elements associated with the "Sales Presentations" page may be hidden to focus user's attention to dialog 460 without a loss of context. Thus, the dialog may be presented without a page refresh by the web application. The hiding may take different forms. According to one embodiment, the portion behind dialog 460 may be grayed (in a transparent manner). Main controls of the browsing application user interface may be left in an active mode or hidden as well. Other forms of hiding may include a change of text and graphic colors (to lighter colors for example), employing various transparency factors, and the like.

In a web application according to embodiments, dialogs and the user interface may have two transitions and three states that help users maintain task continuity. First, users may see a list with no dialog as shown in FIG. 3. A list item may be opened as discussed above. Next, users may be presented with a form that allows them to view summary information 466 for the selected item. The form may be launched in a dialog, overlaid on the partially hidden list. Dialog 460 may include user interface 464 of grouped control elements (e.g. "Manage" group and "Actions" group). A "View" tab 462 at the top portion of the dialog indicates the user the state of the dialog (view state) with the header portion of the dialog 460 indicating the parent web page and the selected document.

Dialog header 461 is composed of a title, window controls, the user interface controls 464 and tab 462. The position of the user interface controls and tab under the title provide visual continuity with the default user interface controls. The same dark background may be used behind tab 462 in both the dialog and standard page settings. Moreover, the background behind the title and the tabs may be the same. This seamless display affords the space to display contextual tabs. Upon selection of "Edit Item" command 468 among the user interface controls 464 of dialog 460, a new form may be opened within the dialog as discussed below.

Figure 5:
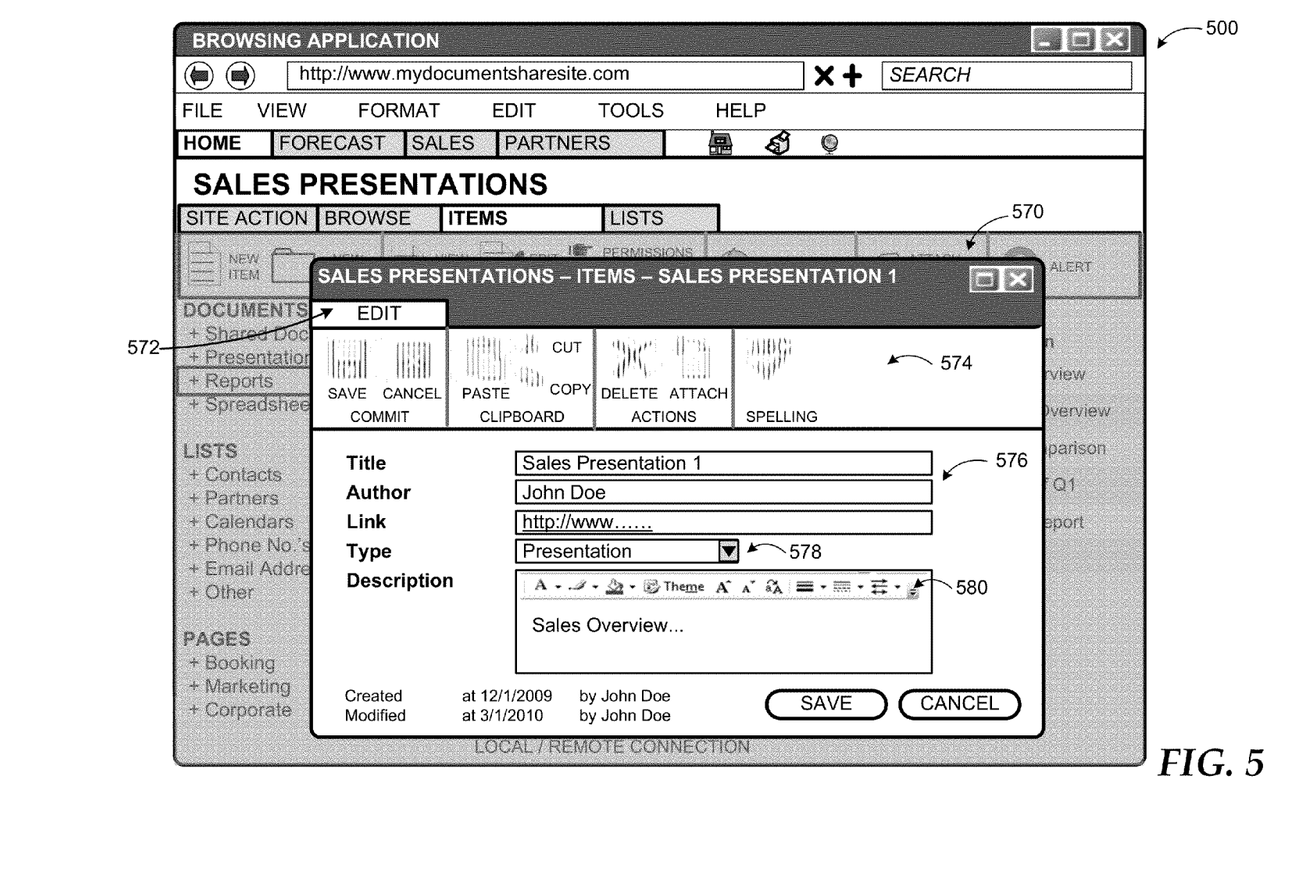
FIG. 5 illustrates another example dialog presenting an editing form to a user.

FIG. 5 illustrates another example dialog presenting an editing form to a user. Upon selection of the edit command on the dialog 460 of FIG. 4, dialog 570 may be presented within the same web page of browsing application 500. The new form is for enabling users to edit the content of an item such as "Sales Presentation 1" document, which is being used as an illustrative example herein. The "Edit" (572) form replaces the initial "View" dialog and includes controls 574. Continuity with the underlying list view may be maintained throughout the transitions. The underlying list is hidden, but still visible. No web page is refreshed. Controls for interacting with the web application (e.g. to edit the content) are presented using the same style and position throughout each user interface state.

User interface controls 574 are contextual controls, i.e. a number, a type, and an order of the controls may be adjusted based on the context of the currently displayed form. For example, the dialog 570 enables a user to modify (or input) summary information 576 about the selected item (document "Sales Presentation 1" in this case) such as a title of the document, an author of the document, a link to the document, a type of the document, and a description of the document. Some of the information may be presented in text boxes for the user to make textual entries without the ability to modify any attribute of the text. Other portions of the information may be selectable among available choices such as the drop-down menu box 578 for the type of the document. Yet other portions of the information may be presented in a text box (e.g. description of the document), where the user is enabled to format the textual entry through a set of user interface controls 580 embedded into the text box.

As mentioned above, the contextual controls of the dialog user interface (574) may be grouped according to functional categories such as the "Commit" group for editing action related operations, the "Clipboard" group for copying operations, "Actions" group for document related operations, and the "Spelling" group for spellchecking and similar operations. Some of the controls such as the "Save" or "Cancel" commands in the "Commit" group may also be presented as buttons within the dialog and result in closing of the dialog 570 upon completion of the respective behavior (e.g. saving of the document). Of course fewer or additional groups and controls may be used in implementing a web dialog according to embodiments.

Figure 6:
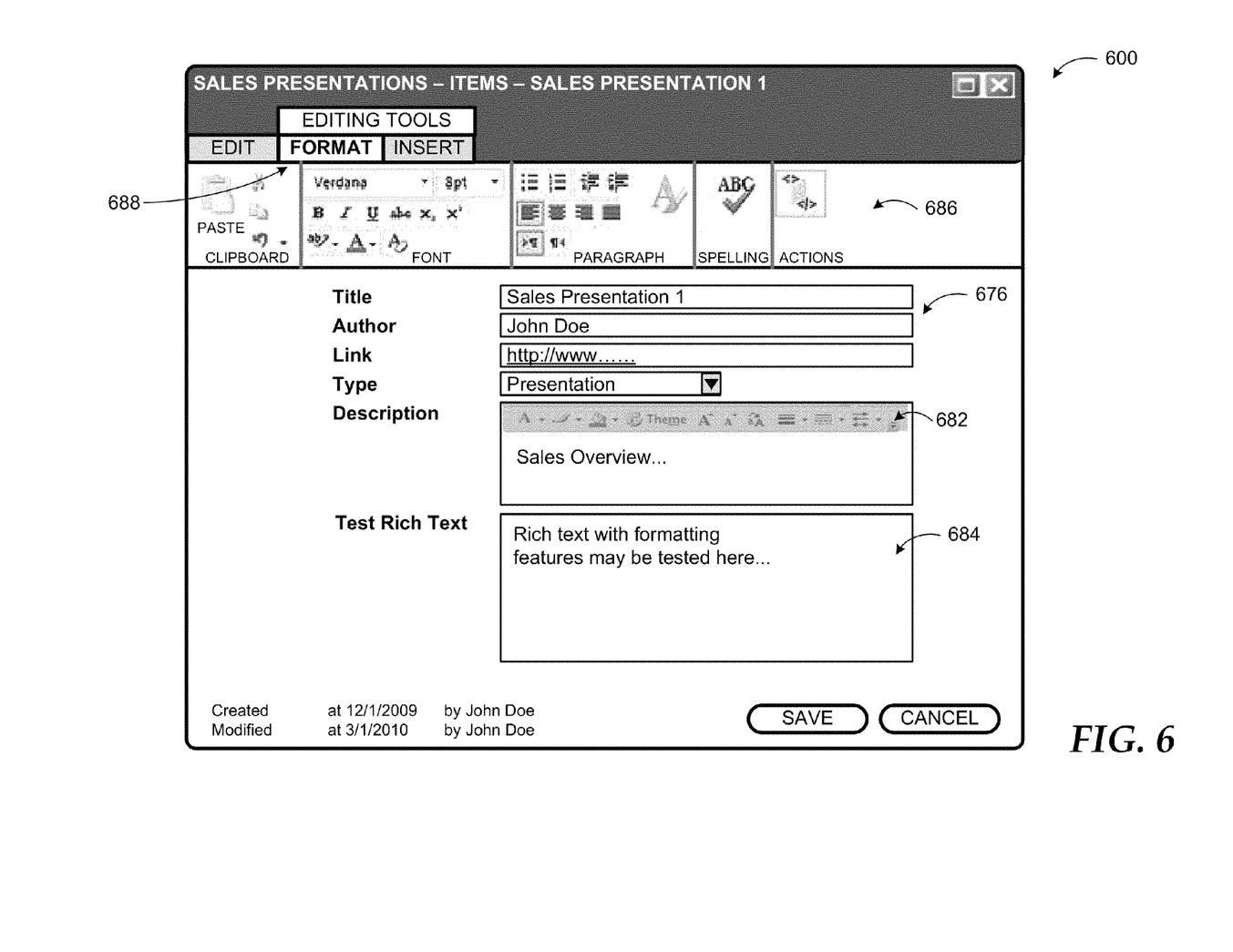
FIG. 6 illustrates a further example dialog presenting an editing form with rich text contextual tabs and controls to a user.

FIG. 6 illustrates a further example dialog presenting an editing form with rich text contextual tabs and controls to a user. As users switch between form fields, different contextual tabs may appear in a dialog such as dialog 600. For example, when the dialog includes rich text fields (formattable text), switching to a rich text field may auto-navigate the user to the format text tab 688 of the user interface with relevant control elements 686. Dialog 600 may still be presented within the original web page with portions of the web page hidden, thereby providing a continuity of context without distracting the user with elements of the original web page.

As the illustrated example shows, the format text tab 688 includes control groups like the "Paragraph" group for paragraph formatting operations, the "Font" group for font formatting operations, in addition to previously presented groups like the "Clipboard" group and the "Spelling" group. Thus, the user is enabled to interact with the form field in detail while having a contextually consistent experience throughout the interaction via different dialogs.

Dialog 600 includes, in addition to text boxes for some of the summary information 676, rich text input box 684. When the user focuses on the rich text box 684 (e.g. by clicking on it, hovering on it, or simply entering text), the formatting controls in the format text tab 686 may become active enabling the user to modify attributes of the text within rich text box 684.

As discussed in conjunction with FIG. 5, the description text box may be associated with rich text in some cases and with basic text in other cases. In the illustrated example, the description may be no longer rich text. This may result in deactivation of the formatting controls 682 by completely or partially hiding them (e.g. by graying the control area). Embodiments are not limited to enabling users to format textual entries of a web page. Graphical and other entries may also be editable through appropriate controls on the dialog.

The examples in FIG. 3 through 6 have been described with specific document types, user interface elements, configurations, and interactions. Embodiments are not limited to systems according to these example configurations. Integrated user interface controls for web dialogs may be implemented in configurations using other types of documents, user interface elements, and configuration in a similar manner using the principles described herein. For example, viewing and editing of a document has been used above as an illustrative example. According to other embodiments, a web page may present a task list and dialogs similar to those discussed above may be used to view, edit, and perform tasks on the list.

Figure 7:
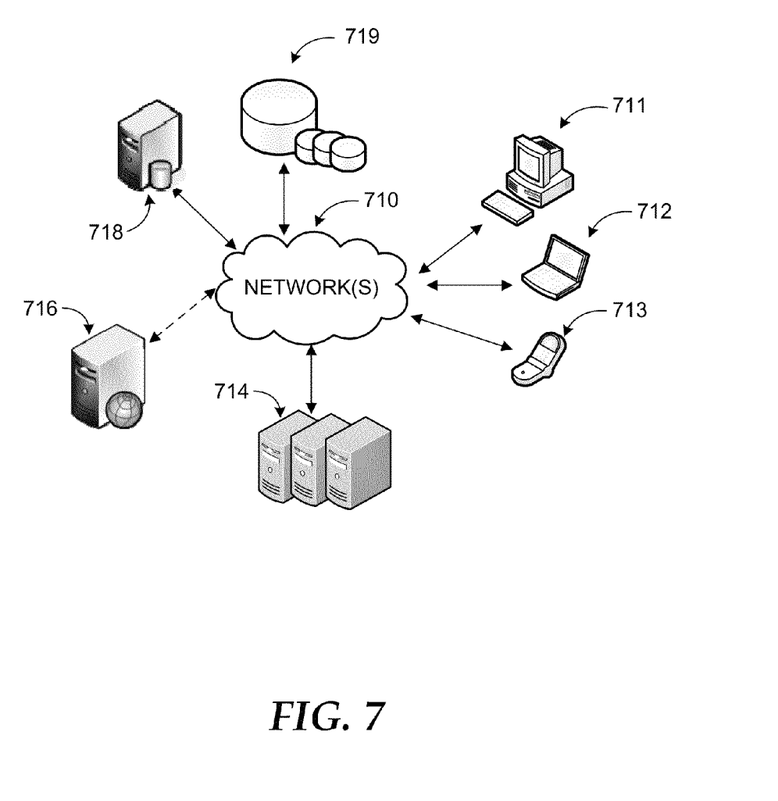
FIG. 7 is a networked environment, where a system according to embodiments may be implemented.

FIG. 7 is an example networked environment, where embodiments may be implemented. Integrated user interface controls for web dialogs may be implemented via software executed over one or more servers 714 such as a hosted service. The platform may communicate with client applications on individual computing devices such as a smart phone 713, a laptop computer 712, or desktop computer 711 ('client devices') through network(s) 710.

Client applications executed on any of the client devices 711-713 may interact with a web application through a browsing application on the servers 714, or on individual server 716. User interface control elements of the hosted page may be presented in the same style (and/or order) as in the parent application adjusted for available viewing space. Users may be enabled to maintain task continuity while focusing on one item in a list. Furthermore, contextual continuity may be accomplished employing similarly arranged control elements in different dialog states as discussed previously. The web application may retrieve relevant data from data store(s) 719 directly or through database server 718, and provide requested services (e.g. document editing) to the user(s) through client devices 711-713.

Network(s) 710 may comprise any topology of servers, clients, Internet service providers, and communication media. A system according to embodiments may have a static or dynamic topology. Network(s) 710 may include secure networks such as an enterprise network, an unsecure network such as a wireless open network, or the Internet. Network(s) 710 may also coordinate communication over other networks such as Public Switched Telephone Network (PSTN) or cellular networks. Furthermore, network(s) 710 may include short range wireless networks such as Bluetooth or similar ones. Network(s) 710 provide communication between the nodes described herein. By way of example, and not limitation, network(s) 710 may include wireless media such as acoustic, RF, infrared and other wireless media.

Many other configurations of computing devices, applications, data sources, and data distribution systems may be employed to implement a platform for providing web dialogs with integrated user interface controls. Furthermore, the networked environments discussed in FIG. 7 are for illustration purposes only. Embodiments are not limited to the example applications, modules, or processes.

Figure 8:
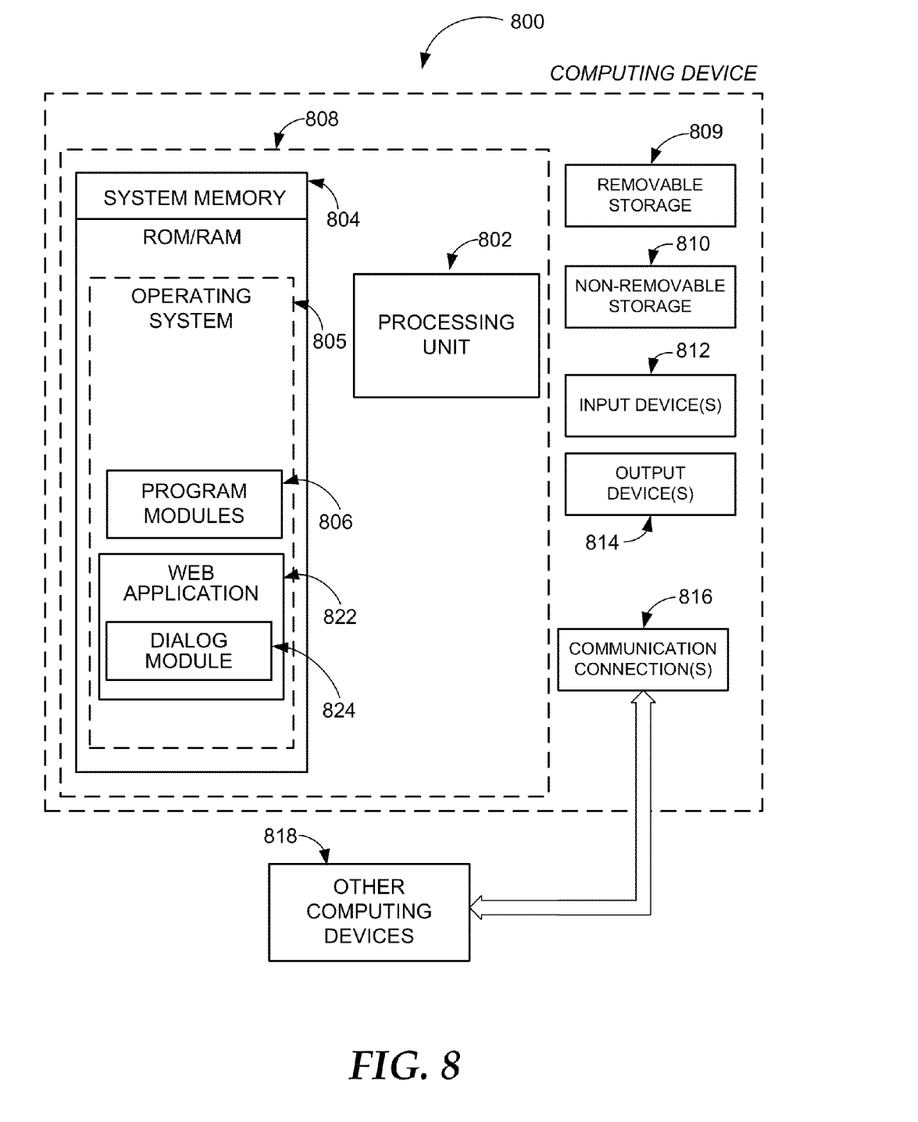
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment for an application according to embodiments is illustrated, such as computing device 800. In a basic configuration, computing device 800 may be a server executing a web application capable of providing hosted web pages inside or outside a dialog according to embodiments and include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of the platform, such as the WINDOWS® operating systems from MICROSOFT CORPORATION of Redmond, Wash. The system memory 804 may also include one or more software applications such as program modules 806, web application 822, and dialog module 824.

Web application 822 may provide web-based services such as viewing, editing, and comparable processing of documents to remote users through a browsing application on the user's client device. Through the dialog module 824, web application 822 may display hosted web pages inside a dialog employing a consistently styled user interface of control elements maintaining task continuity as discussed previously. Web application 822 and dialog module 824 may be separate applications or an integral component of a hosted service. This basic configuration is illustrated in FIG. 8 by those components within dashed line 808.

Computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 809 and non-removable storage 810. Computer readable storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 800. Any such computer readable storage media may be part of computing device 800. Computing device 800 may also have input device(s) 812 such as keyboard, mouse, pen, voice input device, touch input device, and comparable input devices. Output device(s) 814 such as a display, speakers, printer, and other types of output devices may also be included. These devices are well known in the art and need not be discussed at length here.

Computing device 800 may also contain communication connections 816 that allow the device to communicate with other devices 818, such as over a wired or wireless network in a distributed computing environment, a satellite link, a cellular link, a short range network, and comparable mechanisms. Other devices 818 may include computer device(s) that execute communication applications, other web servers, and comparable devices. Communication connection(s) 816 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 9:
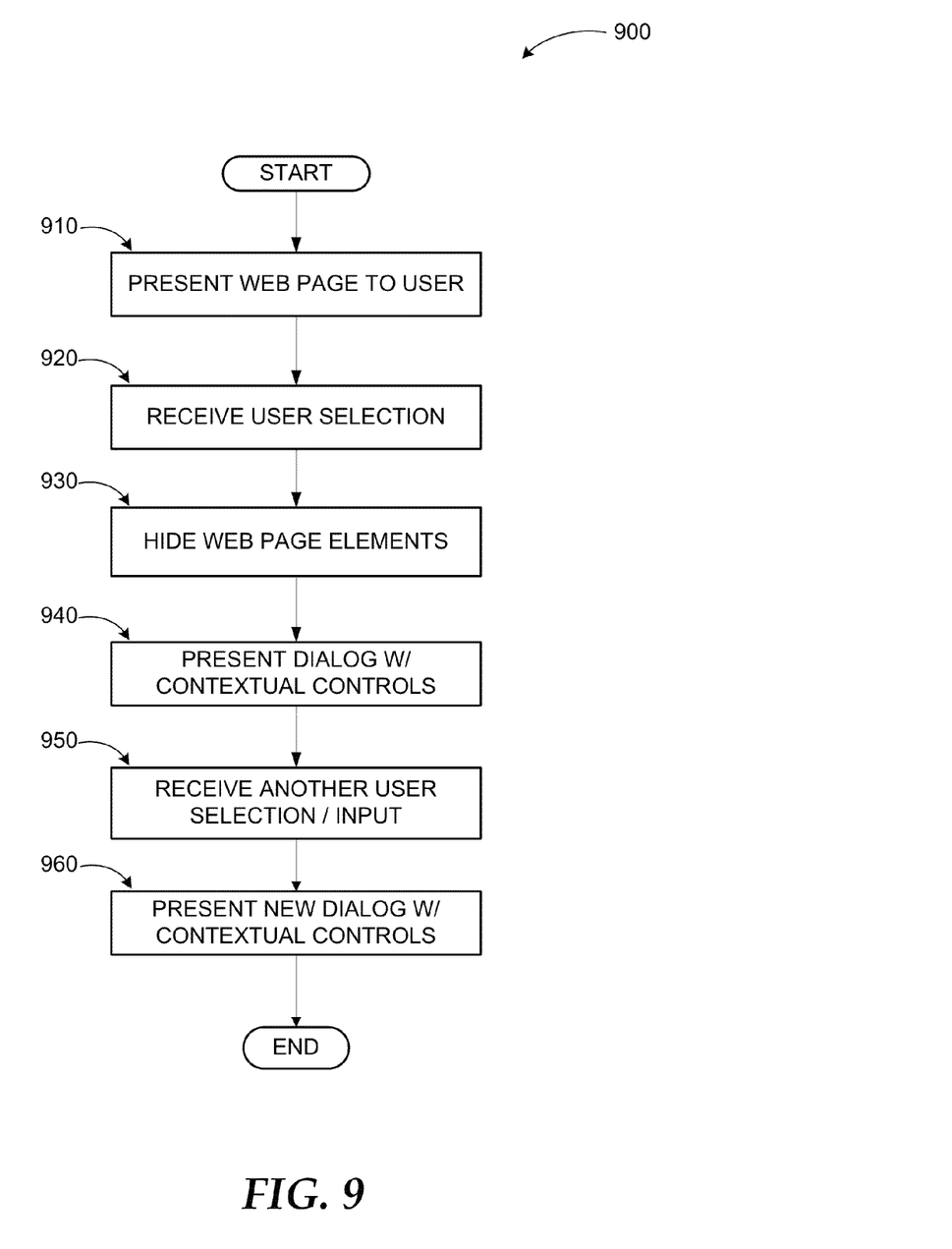
FIG. 9 illustrates a logic flow diagram for a process of providing a dialog platform that supports integrated user interface controls for web dialogs according to embodiments.

FIG. 9 illustrates a logic flow diagram for process 900 of providing a dialog platform that supports integrated user interface controls for web dialogs according to embodiments. Process 900 may be implemented as part of a web application executed on a server.

Process 900 begins with operation 910, where a web page is presented to the user by the web application through the user's browsing application. The web page may provide a list of tasks or documents. At operation 920, a user selection may be received indicating the user's desire to view, edit, or perform a similar operation on one of the items on the list. The user selection may be directly from the list of items or through a command control on the browsing application's user interface.

At operation 930, a portion of the displayed web page may be hidden (e.g. by graying the area) to maintain contextual continuity while focusing user's attention to a dialog presented with contextual controls at operation 940. The contextual controls of the dialog may be grouped based on functional categories and selected based on a state of the dialog, available viewing space, user preferences, and similar factors.

Upon indication of another selection by the user (e.g. a desire to edit or view a presented document) at operation 950, the dialog may be transitioned to a new state at operation 960 presenting another set of contextual controls associated with the current state of the dialog as discussed previously. Alternatively, the dialog may be closed and another one opened for presenting the other set of contextual controls. The dialogs are presented within the web page and may transition seamlessly enabling the user to maintain task continuity.

If content of the selected item is formattable, a state of the dialog may enable the user to modify formatting of content of a selected item. The contextual controls in an edit state may include controls for managing the selected item and controls for inserting and removing content for the attributes associated with the selected item. The contextual controls in each state may be presented in consistent location at a top portion of the dialog. A portion of the set of contextual controls may also be presented in another location of the dialog. Moreover, the contextual controls may enable the user to close an existing dialog, open a new dialog, and/or change a state of the existing dialog without affecting a state of the parent web page.

The operations included in process 900 are for illustration purposes. Integrated user interface controls for web dialogs may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for providing integrated user interface controls for web dialogs, the method comprising:

presenting a parent web page displaying web page elements to a user from a web application;

hiding at least a portion of the displayed web page elements in response to receiving a user selection in a parent web page including at least one of: a desire to edit content, a desire to create new content, or a desire to fill a form;

presenting a dialog over the hidden web page elements within the web page, wherein the dialog includes a set of contextual controls for enabling the user to view content, edit the content, create the new content, and to perform data mining, search, and analysis on the content;

enabling the user to transition between different states of the dialog associated with a category of tasks to be performed on a selected item, wherein a different set of contextual controls are displayed in association with each dialog state in a same style and position on each different state for performing one or more of: managing the selected item, editing an attribute of the selected item, editing a content of the selected item, or formatting the content of the selected item, such that consistency of the contextual controls is maintained;

hiding at least a portion of the currently displayed dialog; and launching a new state in a new dialog over top of the hidden portion of the currently displayed dialog wherein the new state includes a tab for indicating which dialog state is presented, a header portion for indicating the web page and the selected item, and a different set of contextual controls displayed in association with the new state in a same style and position as the hidden dialog.

2. The method of claim 1, wherein the states of the dialog include:

a first state presenting summary information associated with the selected item;

a second state enabling the user to modify a plurality of attributes associated with the selected item; and a third state enabling the user to modify formatting of content of the selected item.

3. The method of claim 2, wherein the set of contextual controls in the first state include controls for managing the selected item and controls for actions associated with the selected item.

4. The method of claim 2, wherein the set of contextual controls in the second state include controls for managing the selected item and controls for inserting and removing content for the attributes associated with the selected item.

5. The method of claim 2, wherein the set of contextual controls in each state are presented in consistent location at a top portion of the dialog.

6. The method of claim 5, wherein a portion of the set of contextual controls is presented also in another location of the dialog.

7. The method of claim 2, wherein the set of contextual controls in the third state include controls for managing the selected item, controls for inserting and removing content for the attributes associated with the selected item, and controls for formatting content of the selected item.

8. The method of claim 2, wherein one or more of: a style, a number, a type, or an order of the set of controls for each state of dialog are automatically selected based on one or more of: a type of the selected item, a dialog state, a user preference, or an available viewing space.

9. The method of claim 2, wherein each dialog state is displayed without page refresh in the parent web page.

10. The method of claim 1, wherein the set of contextual controls enable a user to one of: close an existing dialog, open a new dialog, or change a state of the existing dialog without affecting a state of the parent web page.

11. The method of claim 1, wherein hiding at least a portion of the displayed web page elements and the currently displayed dialog by performing an operation including at least one of:
    graying the elements,
    rendering the elements transparent,
    rendering the elements translucent,
    presenting the dialog with a stylized border, or
    modifying text and graphics colors, to prevent distraction of the user by the parent web page.

12. A server for providing a web application employing integrated user interface controls for web dialogs, the server comprising:
    a memory;
    a display; and
    a processor coupled to the memory, the processor executing web dialog module, wherein the web dialog module is configured to:
        present a parent web page to a user from the web application through the display;
        in response to receiving a user selection in the parent web page indicating one of: a desire to edit content, a desire to create new content, or a desire to fill a form, present a dialog for performing tasks associated with the selection through the display, the tasks including at least one of: viewing content, editing the content, creating the new content, performing data mining, searching, or analyzing on the content; wherein the dialog is presented without a parent web page refresh such that contextual continuity is maintained between the dialog and underlying documents;
        present within the dialog on the display a set of contextual controls for performing one or more of: managing a selected document, editing an attribute of the selected document, editing a content of the selected document, or formatting the content of the selected document, wherein the contextual controls include at least one of: a text box, a drop-down menu, a hover on menu, or a button for enabling the user to select tasks associated with the contextual controls, and wherein a location and a style of the set of contextual controls are selected to maintain consistency between the parent web page and different states of the dialog;
        enable the user to transition between different states of the dialog associated with a category of tasks to be performed on the selected document, wherein a set of contextual controls are provided in each state of the dialog in a same style and position on each different state for performing at least one from a set one or more of: managing the selected document, editing an attribute of the selected document, editing a content of the selected document, and or formatting the content of the selected document;
        detect a user selection of one of the contextual controls on the currently presented dialog for transitioning to a new state associated with the currently presented dialog;
        hide at least a portion of the currently presented dialog; and
        launch a new state in a new dialog over top of the hidden portion of the currently displayed dialog, wherein the new state includes a tab for indicating which dialog state is presented, a header portion for indicating the parent web page and the selected document, and a different set of contextual controls displayed in association with the new state in a same style and position as the hidden dialog.

13. The server of claim 12, wherein the different states of the dialog include at least a first state presenting summary information associated with the selected document, a second state enabling the user to modify a plurality of attributes associated with the selected document, and a third state enabling the user to modify formatting of the content of the selected document, and wherein each state of the dialog includes a control element enabling the user to transition to another state of the dialog.

14. The server of claim 13, wherein the dialog includes a plurality of contextual tabs, and the web dialog module is further configured to:
    detect the user's switch between form fields on the dialog; and
    display a contextual tab corresponding to functionality associated with a switched form field, wherein each contextual tab is associated with a different set of contextual controls.

15. The server of claim 12, wherein the parent web page presents a list of documents, and enables the user to one of: edit existing documents, remove existing documents, or add a new document.

16. The server of claim 12, wherein the web application is part of one of: an enterprise network, a cloud-based network, or a combination of enterprise and cloud-based network.

17. A device for providing integrated user interface controls for web dialogs, the device comprising:
    a memory;
    a display device;
    a processor coupled to the memory and the display device, the processor executing a web application, wherein the web application is configured to:
        present through the display device a web page displaying a list of documents to a user from the web application;
        receive a user selection of a document from the list;
        present through the display device a dialog for performing tasks associated with the selected document within the web page, for enabling the user to view content, edit the content, create a new content, and to perform data mining, search, and analysis on the content, wherein the dialog is presented without a web page refresh such that contextual continuity is maintained between the dialog and the underlying list of documents;

enable the user to transition between different states of the dialog associated with a category of tasks to be performed on the selected document, wherein a set of contextual controls are provided in each state of the dialog in a same style and position on each different state for performing one or more of: managing the selected document, editing an attribute of the selected document, editing a content of the selected document, or formatting the content of the selected document;

detect a user selection of one of the contextual controls on the currently presented dialog for transitioning to a new state associated with the currently presented dialog;

hide at least a portion of the currently presented dialog; and launch a new state in a new dialog over top of the hidden portion of the currently presented dialog, wherein the new state includes a tab for indicating which dialog state is presented, a header portion for indicating the web page and the selected document, and a different set of contextual controls displayed in association with the new state in a same style and position as the hidden dialog.

18. The device of claim 17, wherein the set of contextual controls are provided at a predetermined location in a header portion of each state of the dialog such that user experience consistency is maintained through one or more of: a style, an order, or a background of the set of contextual controls.

19. The device of claim 17, wherein at least one state of the dialog includes form fields for enabling the user to one of insert or modify textual attributes and textual content associated with the selected document.

20. The device of claim 19, wherein the web application is further configured to:

in response to detecting the user's transitioning to a new form field, one of display or hide formatting controls in association with the new form field based on whether the new form field is capable of processing rich text.

\* \* \* \* \*